United States Patent [19]

Reed

[11] 4,240,504
[45] Dec. 23, 1980

[54] SIMULTANEOUS MICROEMULSION-AQUEOUS PHASE FLOODING PROCESS

[75] Inventor: Ronald L. Reed, Houston, Tex.

[73] Assignee: Exxon Production Research Company, Houston, Tex.

[21] Appl. No.: 972,118

[22] Filed: Dec. 21, 1978

[51] Int. Cl.² .............................................. E21B 43/22
[52] U.S. Cl. .................................. 166/273; 166/252; 166/274; 166/275
[58] Field of Search ............... 166/273, 274, 275, 252, 166/305 R, 269

[56] References Cited

U.S. PATENT DOCUMENTS

| Re. 27,198 | 10/1971 | Gogarty | 166/252 |
|---|---|---|---|
| 3,500,922 | 3/1970 | O'Brien et al. | 166/273 |
| 3,561,530 | 2/1971 | Tosch | 166/252 |
| 3,605,895 | 9/1971 | Jones | 166/273 |
| 3,768,560 | 10/1973 | Hill et al. | 166/274 |
| 3,770,056 | 11/1973 | Campbell et al. | 166/273 |
| 3,885,628 | 5/1975 | Reed et al. | 166/252 |
| 3,938,591 | 2/1976 | Ossip et al. | 166/275 |
| 3,981,361 | 9/1976 | Healy | 166/275 X |
| 3,983,940 | 10/1976 | Carpenter, Jr. et al. | 166/273 |
| 4,013,125 | 3/1977 | Plummer et al. | 166/273 |
| 4,125,156 | 11/1978 | Glinsmann | 166/252 |

OTHER PUBLICATIONS

Szabo, M. T., "Some Aspects of Mobility Buffer Design in Surfactant Flooding," SPE 6201, 1976.
Szabo, M. T., "The Effect of Sulfonate/Polymer Interaction on Mobility Buffer Design," Society of Petroleum Engineers Journal, Feb. 1979. pp, 4–14.

*Primary Examiner*—Stephen J. Novosad
*Assistant Examiner*—George A. Suchfield
*Attorney, Agent, or Firm*—Michael A. Nametz

[57] ABSTRACT

A method of enhanced oil recovery is disclosed wherein an upper-phase or a middle-phase microemulsion and an immiscible aqueous phase are simultaneously injected into a subterranean formation. The viscosities of the injected phases are adjusted so that the aqueous phase/microemulsion viscosity ratio approximates the reservoir brine/oil viscosity ratio. The injection rates of the injected phases are such that similar oil, microemulsion and aqueous phase velocities are achieved in the reservoir. Oil is displaced to a production well and recovered.

17 Claims, 6 Drawing Figures

SIMULTANEOUS MICROEMULSION-AQUEOUS PHASE FLOODING PROCESS

BACKGROUND OF THE INVENTION

1. Field of the Invention

This invention relates to the recovery of oil from a subterranean formation. More specifically, this invention relates to the recovery of oil from subterranean formations by injecting thereinto mutually immiscible phases where one phase is a microemulsion and another phase is an aqueous solution.

2. Description of the Prior Art

The petroleum industry has recognized for many years that only a small fraction of the original oil in place in a reservoir is expelled by natural mechanism. It is also well-known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most widely practiced method for recovering oil from a formation after naturally occurring forces in the formation have declined in their ability to expel oil. In waterflooding, water is injected through an input well to drive oil to offset producing wells. Much of the current work in oil recovery technology has been directed toward improving the efficiency of waterflooding processes or developing alternative process.

Surface-active agents or surfactants are one class of materials which have been proposed for improving the efficiency of wateflooding processes. Much of the oil that is retained in the reservoir after a typical waterflood is in the form of discontinuous globules or discrete droplets which are trapped within the pore spaces of the reservoir. Because the normal interfacial tension between the reservoir oil and water is so high, these discrete droplets are unable to sufficiently deform to pass through narrow constrictions in the pore channels. When surface-active agents are added to the flood water, they lower the interfacial tension between the water and the reservoir oil and permit the oil droplets to deform and flow with the flood water. It is generally conceded that the interfacial tension between the flood water and the reservoir oil must be reduced to less than 0.1 dyne/cm for additional recovery.

Although conventional surfactant waterflooding may be effective in obtaining addition oil from subterranean oil reservoirs, it has a number of shortcomings which detract seriously from its value. One difficulty which has been observed in the use of surfactants in general is the tendency of the surfactants to be depleted from the injected solution. It has been demonstrated that at least a portion of the surface-active agents are adsorbed on the rock surface of the reservoir or/and a portion is physically entrapped within the pore spaces of the rock matrix. It is also known that many surfactants react with ionic substances in the water within the formation and are thereafter unable to interact at the oil/water interface to reduce the interfacial tension. This surfactant depletion can reduce oil recovery efficiency.

One method for reducing surfactant depletion and increasing oil recovery is the use of microemulsions. Microemulsions are stable, transparent or translucent mixtures of a liquid hydrocarbon, water and a surfactant. Optionally, a co-solvent such as alcohol and electrolytes may be present in the mixture. Generally, microemulsions may be oil-external, water-external or microemulsions wherein no external phase can be identified. Conventionally, a microemulsion is miscible with the crude oil in the formation and the polymer water which displaces it at least when initially injected.

In practice, a microemulsion slug is typically injected into the formation and driven towards a producing well by an aqueous slug thickened with a polymer. A problem arises in that once the microemulsion and drive slugs begin moving through the formation, for a variety of reasons, the polymer often moves more rapidly than the microemulsion components. The result is a mixing of polymer, surfactant, and other microemulsion components often causing undesired phases to appear, altering mobilities, abruptly changing saturations, and increasing surfactant retention. Some of these problems and possible reasons thereof are discussed in detail by E. I. Sandvik and J. M. Maerker in "Application of Xanthan Gum for Enhanced Oil Recovery", ACS Symposium Series, No. 45, *Extracellular Microbial Polysaccharides*, edited by P. A. Sanford and A. Laskin, p. 242 (1977). Another problem that occurs is the rate that the various slugs can be injected is often a limiting factor in the rate that oil can be displaced and produced. Thus, even if the reservoir process is relatively efficient, production rates often would not be great enough to warrant a microemulsion flood, simply because the various slugs cannot be injected at a high enough rate.

One approach to the various problems found in microemulsion flooding is described in U.S. Pat. No. 3,768,560 (issued on Oct. 30, 1973 to H. J. Hill and D. R. Thigpen). There, the concentration of the polymer in the thickened drive water slug is adjusted to give a mobility as low as that of the reservoir fluids, and the concentration of the surfactant in the microemulsion slug adjusted to provide a rate of frontal advance of surfactant that equals the rate of frontal advance of polymer. While tailoring of such initial concentrations in a conventional microemulsion flooding process does, to some extent, improve the efficiency of the process, there still remains unanswered problems inherent in flooding over vast reservoir distances. That is, as the slugs move through the reservoir, due to permeability variations throughout the reservoir, various retention mechanisms (e.g. adsorption and inaccessible pore volume to polymer) act to vary chemical concentrations. Wide variations in phase behavior can still occur, with adverse mobilities and unacceptably high interfacial tensions resulting.

In a departure from conventional microemulsion flooding, wherein the microemulsion is miscible with the formation fluids at least prior to injection, it has been suggested in U.S. Pat. No. 3,885,628 (issued to Reed et al on May 27, 1975) to inject microemulsion systems which are initially immiscible with formation crude oil and formation water. This patent also suggests injecting two or more mutually immiscible phases into the oil-bearing formations to recover oil. The different phases preferably have physical and chemical properties broadly approximating those of the formation fluids. Although this approach to microemulsion flooding appears to have promise in recovering oil, surfactant and polymer adsorption and retention continue to reduce displacement efficiency. A need exists for an improved microemulsion flooding system and method for recovering oil.

SUMMARY OF THE INVENTION

The present invention relates to a microemulsion flooding process which substantially alleviates the above problems. In accordance with this invention, a process is provided for recovering oil from a subterranean formation wherein an aqueous phase and an immiscible upper- or middle-phase microemulsion are simultaneously injected into the formation through an injection means. Furthermore, the physical properties of the injected immiscible phases are adjusted based on the properties of the formation fluids so as to significantly increase oil displacement efficiency.

Briefly, it has been found that many of the problems that have plagued microemulsion flooding methods proposed heretofore can be mitigated by simultaneous injection of an upper- or middle-phase microemulsion and an immiscible thickened aqueous phase according to special flooding design criteria so that the oil-bank and microemulsion-bank saturations are similar and frontal velocities of oil-bank, microemulsion-bank and thickened-aqueous phase bank are also similar.

Specifically it has been found that displacement efficiency can be significantly enchanced by (a) adjusting the viscosities of the mutually immiscible phases to give a viscosity ratio of microemulsion to aqueous phase which is approximately equal to the viscosity ratio of oil to water in the formation; and (b) simultaneously injecting these phases utilizing a predetermined injection rate ratio of microemulsion to aqueous phase adjusted to give substantially similar oil-bank and microemulsion aqueous-phase bank velocities. The viscosity of the microemulsion must be greater than that of the hydrocarbon and aqueous liquids in the formation, while the viscosity of the aqueous phase must be greater than that of the aqueous liquids in the formation. The viscosities of both the microemulsion and aqueous phases should preferably also be greater than the viscosities of the formation fluids.

The viscosity ratio is determined simply by measuring the viscosities of the resident oil and brine at formation conditions, while the injection rate ratio may be obtained from the water saturations in the stabilized bank, the polymer solution retention and inaccessible pore volume characteristics.

By using these selection criteria, microemulsion displacement of oil in the formation is significantly enhanced, favorable mobility ratios exist during the flooding process and a significant increase in the injectivity of the immiscible phases is made possible.

In essence, the present invention provides for the injection of mutually immiscible phases which are designed to be compatible with each other, with the formation fluids and with drive fluids later injected. Changes in phase behavior are minimized. Because of the unique design, the microemulsion phase is believed to preferentially displace oil, while the immiscible aqueous phase preferentially displaces water wih all phases moving at substantially equivalent velocities through the formation.

DESCRIPTION OF THE PREFERRED EMBODIMENT

Figure 1:
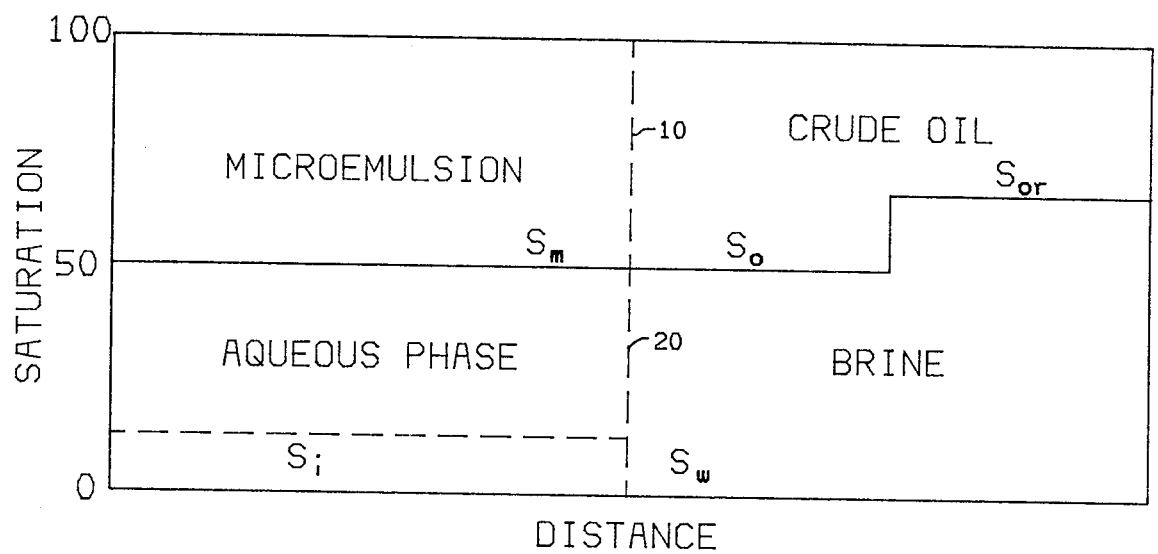
FIG. 1 is a schematic illustration showing liquid saturations in an oil bearing subterranean formation during a flooding operation where mutually immiscible microemulsion and aqueous phases are simultaneously injected into the formation.

In accordance with the practice of this invention, mutually immiscible microemulsion and aqueous liquid phases are simultaneously injected by means of a well into a subterranean formation to recover oil. It has been found that enhanced oil recovery can be obtained from such subterranean formation by (a) simultaneously injecting into the formation mutually immiscible microemulsion and aqueous liquid phases where the ratio of the microemulsion viscosity to aqueous liquid viscosity is approximately the same as the ratio of crude oil viscosity to the viscosity of water in the formation; and (b) maintaining a predetermined injection rate ratio which gives similar oil-bank and microemulsion/aqueous liquid phase bank velocities within the formation. The viscosities of the injected phases are also greater than those of the formation fluids.

This process can be applied as a tertiary recovery process subsequent to primary depletion and waterflooding of the formation. However, the process may also be employed in lieu of waterflooding. Normally, the simultaneous injection of microemulsion and aqueous liquid is accomplished by means of one or more injection wells and formation fluids are driven through the reservoir toward offsetting producing wells.

The expression "microemulsion" as used herein is defined as a stable, transparent or translucent micellar solution of oil, water and a surfactant. The solution may optionally contain one or more electrolytes and one or more co-solvents. The upper-phase or middle-phase microemulsion utilized may respectively be oil external or may fall into that class of micellar structures in which there is no identifiable external phase. A discussion of the phase behavior and properties of some microemulsions useful in this invention may be found in R. N. Healy and R. L. Reed, "Multiphase Microemulsion Systems", *Society of Petroleum Engineers Journal*, pp. 147–160 (1976). A general discussion of "microemulsions" may be found in P. A. Winsor, "Solvent Properties of Amphiphilic Compounds", Butterworth's Scientific Publications, London (1954); see also P. A. Winsor, "Liquid Crystallinity in Relation to Composition and Temperature in Amphiphilic Systems", paper presented at the Third International Liquid Crystal Conference, Berlin, Aug. 24–28, 1970.

In the practice of this invention, the microemulsion injected concurrently with the aqueous phase is not limited to any particular upper- or middle-phase microemulsion provided the microemulsion is immiscible with the aqueous phase to be injected. However, the microemulsion should have low surfactant loss during flooding, as well as adequate viscosity and compatibility with all contacted fluids in the formation. Any of the microemulsions conventionally employed in microemulsion flooding operations which meet these criteria can be advantageously utilized in the method of the present invention. In general, the selected microemulsion is designed for a specific application based upon reservoir characteristics.

A microemulsion for use in a specific application may be designed by first determining information concerning the oil bearing formation from which oil is to be recovered. The oil from the formation is analyzed to determine its physical and chemical characteristics. Similarly, water from the formation is analyzed to determine the quantity and type of ionic substances present. The formation temperature is also determined by conventional means. The microemulsion is then formulated on the basis of the information obtained from the subterranean formation. Further information on designing a microemulsion suitable for a specific application is described in U.S. Pat. No. 3,981,361 issued on Sept. 21, 1976 to R. N. Healy, and in R. N. Healy and R. L. Reed, "Immiscible Microemulsion Flooding", *Society of Petroleum Engineers Journal*, pp. 129–139 (1977).

In practicing the invention, the microemulsion and aqueous phase mobilities may be adjusted by incorporating viscosity-imparting agents therein. The term "mobility" is defined by the expression $k/\mu$, where k is the permeability of the formation to the particular fluid phase and $\mu$ is the viscosity of the fluid phase. The sum of the microemulsion and aqueous phase mobilities should be less than the mobility of the flowing formation fluids. Such a mobility is desired to avoid fingering of the microemulsion into the formation fluids. Even though the method of this invention tends to effectively force microemulsion phase into pore spaces containing oil, if this desired feature is not present, the microemulsion may still bypass a substantial portion of the pore spaces containing oil due to excessive fingering. As the ratio of the mobility of the injected phases to formation fluid mobility increases above 1, there is more and more tendency for bypassing. In general, neglecting unusual permeability effects, favorable mobility ratios will be present where the viscosities of the microemulsion and aqueous phase are sufficiently greater than those of the formation fluids.

The preferred microemulsion viscosity for a particular application largely depends on the crude oil viscosity. Some crudes have viscosities as low as 1 or 2 centipoises and others range up to 1000 centipoises or even greater. However, most reservoir crude oils which are capable of being recovered by microemulsion flooding have viscosities in the range of 1 to 20 centipoises at reservoir temperature and pressure.

The aqueous phase injected simultaneously with the microemulsion according to this invention may be any high water content liquid which is immiscible with the microemulsion. Generally, the aqueous phase will be water and water solutions (such as brine) containing a polymeric thickening agent; however, high water content microemulsions, aqueous surfactant solutions, or aqueous surfactant suspensions which are immiscible with the selected middle- or upper-phase microemulsion may also be used in the present invention.

Both preflush salinity (if preflush is used) and polymer drive water salinity may be different from resident brine salinity, and also different from microemulsion and aqueous phase salinities. A detailed discussion of the selection of appropriate salinity values is unnecessary and beyond the scope of the presen disclosure. However, a discussion may be found in S. P. Gupta and S. P. Truskenski, "Micellar Flooding-Compositional Effects on Oil Displacement", SPE 7063, 5th Symposium on Improved Methods for Oil Recovery, SPE of AIME, Tulsa, Oklahoma, Apr. 16–19, 1978.

The mutually immiscible microemulsion and aqueous phases are designed to flow through the formation at substantially the same rate. As mentioned, this is accomplished by varying the viscosities of the injected mutually immiscible microemulsion and aqueous phases, and utilizing a predetermined injection rate ratio of microemulsion to aqueous phase. These criteria may be derived and expressed mathematically. While the mathematical equations presented are certainly not rigorous, they represent a useful approximation of the physical process and correlate with experimental results reported later.

The model of FIG. 1 is the basis for deriving the equations. FIG. 1 schematically represents middle- or upper-phase microemulsion/aqueous phases displacing curde oil and brine from a reservoir, and indicates the percentage saturation of injected and resident fluids at boundary 10 between the microemulsion and crude oil and at boundary 20 between the injected phase and brine. These boundaries are shown by dotted vertical lines for purposes of clarity and convenience in modelling the process; it should be understood, however, that these "boundaries" are, in reality, irregular and not well defined. Indeed, for miscible displacement, these boundaries might better be described as broad concentration gradients; for immiscible displacement, the boundaries may be sharper.

FIG. 1 also depicts the flood after sufficient time has passed to establish stabilized flow and saturation conditions. Thus, the microemulsion saturation in the formation ($S_m$) is shown to be the same as the oil saturation of the oil bank ($S_o$) flowing ahead of the microemulsion bank. The model also shows a certain amount of oil which has not yet been mobilized, and its saturation is equal to the residual oil saturation ($S_{or}$). As the microemulsion moves through the formation, a continuous oil bank forms ahead of the microemulsion zone and flows at an oil saturation [and brine saturation ($S_w$)] that depends primarily on the ultimate saturations and on the fractional flow curve for the resident oil-brine-rock system. These saturations will often be referred to herein as the saturations of the stabilized bank.

Referring now to the model of FIG. 1, the following equations will be approximately satisfied in practicing the method of the present invention:

$$\mu_a/\mu_m = \mu_w/\mu_o \tag{1}$$

$$\frac{k_w}{k_o} \cdot S_w = \frac{\mu_w}{\mu_o} \cdot \frac{S_w - s_i}{1 - S_w} \tag{2}$$

$$\frac{q_a}{q_m} = \frac{S_w - S_i}{1 - S_w} = \frac{q_w}{q_o} \tag{3}$$

where
$\mu$ = viscosity;
k = permeability;

q = volumetric flow rate in the formation;

$S_w$ = saturation of water in the stabilized oil/water bank ahead of the injected microemulsion/aqueous phase (PV);

$S_i$ = saturation of an immobile phase representing the net effect on aqueous phase flow rate of inaccessible pore volume and polymer adsorption.

The subscripts have the following meaning (unless otherwise noted):
a = aqueous phase
m = microemulsion phase
w = formation brine
o = formation crude.

When the relationships given in Equations (1), (2) and (3) are approximated, a significant increase in oil displacement efficiency is predicted. Experimental results are presented later herein which confirm the benefits in using these selection criteria in designing the microemulsion flooding process of the present invention.

All of the parameters used to determine the proper injection conditions can easily be determined by those skilled in the art. Thus, the viscosity of the crude oil and water (or brine) in the formation can be obtained from formation fluid samples using a simple viscosity measuring apparatus.

The value of $S_i$ may be determined from core flooding experiments using sample cores taken from the reservoir of interest. A detailed discussion of one method for determining a value for $S_i$ is given in R. Dawson and R. B. Lantz, "Inaccessible Pore Volume in Polymer Flooding", *Society of Petroleum Engineers Journal*, pp. 448–452 (1972).

Figure 2:
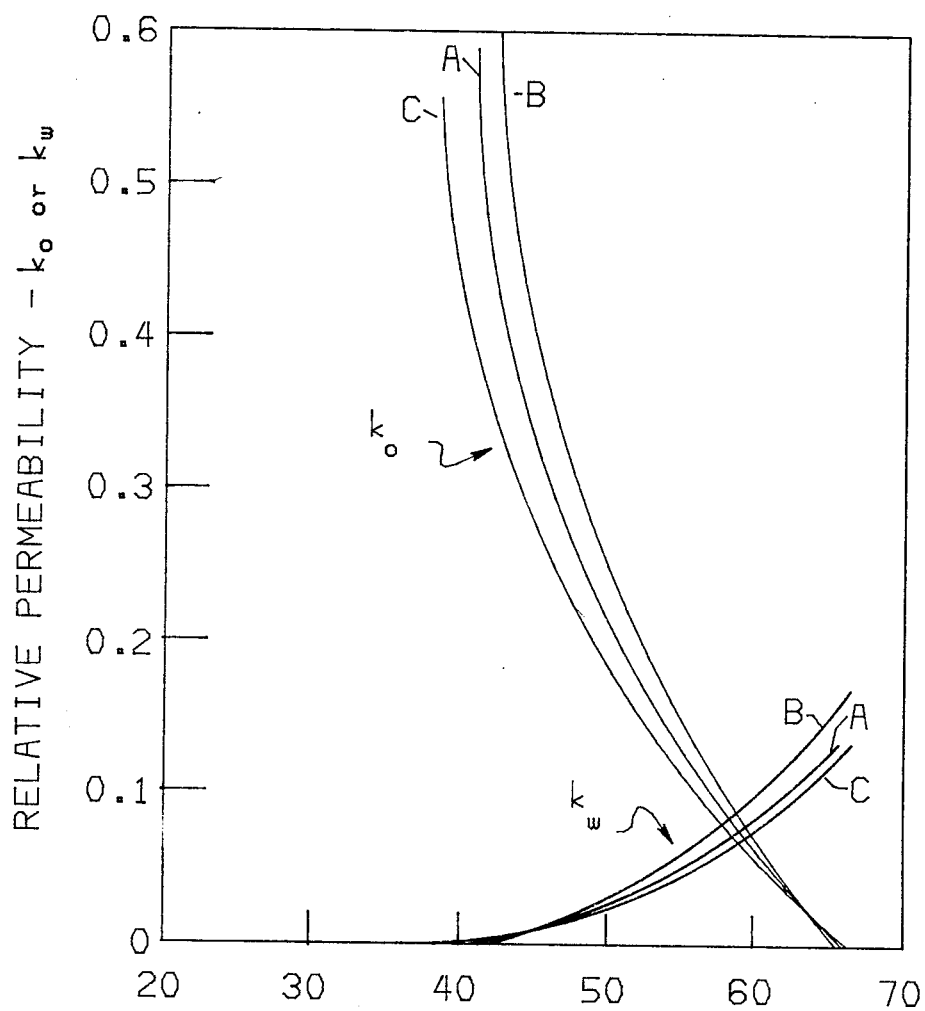
FIG. 2 illustrates the relation between water saturation in sandstone cores and the relative permeability of the cores to flow of oil and water.

The value of $S_w$ is also experimentally determined using known reservoir engineering techniques. From core floods, the relative permeabilities ($k_o$ and $k_w$) of the crude oil and brine system of interest are measured and plotted as a function of water saturation. A typical result is depicted in FIG. 2, wherein three curves each for $k_o$ and $k_w$ are plotted. As will be described later, each curve represents the results for a different sandstone core. These data are then used with reference to Equation (2) to determine $S_w$.

Figure 3:
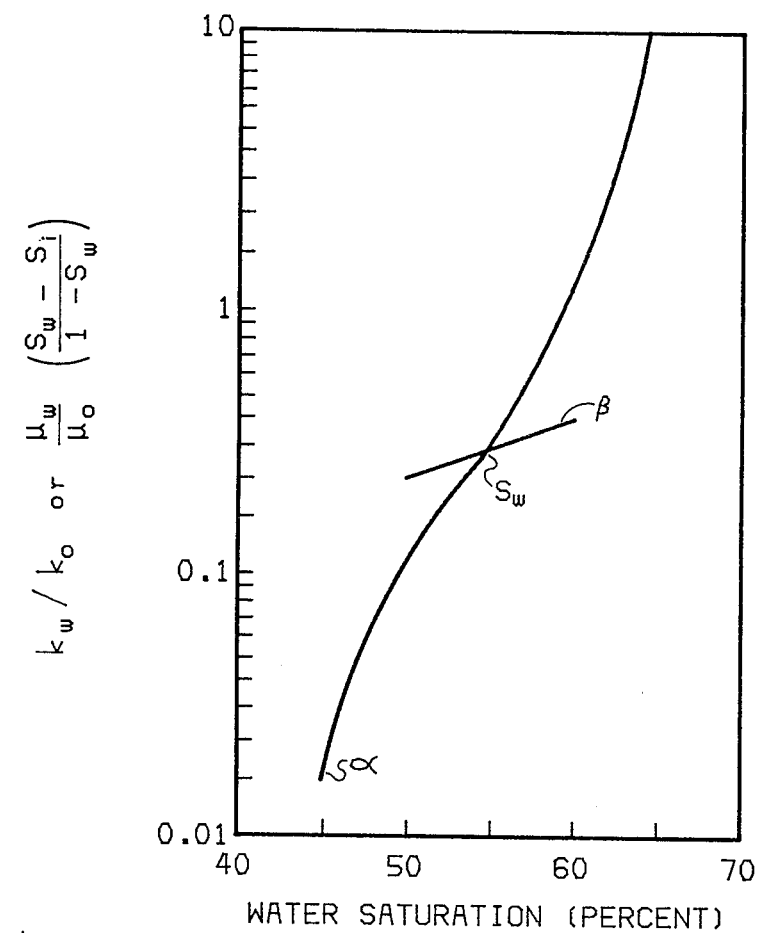
FIG. 3 is a plot used to determine the water saturation of the stabilized oil bank ahead of the microemulsion.

Thus, $k_w/k_o$ is graphed as a function of water saturation to give curve "$\alpha$" of FIG. 3. Then, using viscosity data and the value of $S_i$ previously determined, the quantity $$\frac{\mu_w}{\mu_o} \cdot \frac{S_w - S_i}{1 - S_w}$$

can be calculated for several water saturations over the same range and plotted as curve $\beta$. The intersection of the two curves in FIG. 3 determines $S_w$, the water saturation which will exist in the stabilized oil/water bank being driven through the formation.

In point of fact, the permeability data are usually known for a given reservoir under consideration for micellar flooding. Hence, a value for $S_w$ often can be derived from pre-existing data using the approach described herein. The key design principles of this invention to be recognized, however, are: (a) to use a viscosity ratio of microemulsion to aqueous phase which approximates that of oil to water in the formation; (b) to use an injection rate ratio of microemulsion to aqueous phase which gives the requisite similar bank flow velocities. Also, the absolute viscosities of the microemulsion and aqueous phases should preferably be greater than the crude oil and water (brine) viscosities to maintain favorable mobility ratios (i.e. avoid fingering).

Although the viscosity relationship of Equation (1) may be satisfied by adjusting the microemulsion viscosity, it is particularly preferred to select a suitable microemulsion and then to adjust the aqueous liquid viscosity by incorporating in the aqueous liquid a viscosity increasing agent such as polymer.

Any viscosity increasing agent may be used in the practice of this invention to adjust the microemulsion or aqueous liquid viscosity. Suitable materials may include a wide variety of gums, sugars, and various synthetic polymers. Typical thickeners include water-soluble polymers including polysaccharides, as sold under the trade name "Kelzan XC" by Kelco Corporation, and high molecular weight polyacrylamides, more specifically, partially hydrolyzed polyacrylamides as sold under the trade name "Pusher" by Dow Chemical Company.

The injection rate ratio of the microemulsion phase to the aqueous phase will typically vary within a range of from 0.1 to about 10. As stated, this injection rate ratio is selected such that the microemulsion velocity in the formation is substantially the same as the oil bank velocity flowing ahead of the microemulsion.

The following steps, either in order given or other suitable order, comprise one procedure for practicing the present invention:

1. Measure the crude oil viscosity and the viscosity of the water in a subterranean oil-bearing formation.

2. Select a microemulsion and immiscible aqueous phase which are suitable for chemical flood application under the conditions existing in the oil reservoir in which the invention is to be practiced. The microemulsion may be either an upper-phase or a middle-phase microemulsion, or a mixture thereof, but must effectively displace oil from the formation at the temperature and pressure conditions prevailing in the reservoir to be flooded. The aqueous phase must be immiscible with the microemulsion when thickened with polymer.

3. Measure the viscosity of the selected microemulsion. If the viscosity is less than the crude oil viscosity, adjust the microemulsion viscosity to a value greater than the crude oil viscosity.

4. Adjust the viscosity of the aqueous phase to be injected by adding a viscosity increasing agent to form an aqueous liquid with a viscosity which will approximate the relationship:

$$\mu_a/\mu_m = \mu_w/\mu_o$$

where:
$\mu_a$ = viscosity of the aqueous phase;
$\mu_m$ = viscosity of the microemulsion injected simultaneously with the aqueous phase;
$\mu_w$ = viscosity of water in the formation; and
$\mu_o$ = viscosity of crude oil.

5. From the known or measured permeability data for the reservoir to be flooded, estimate the water saturation ($S_w$) in the stabilized oil bank and the effect on polymer flow rate of absorption and inaccessible pore volume ($S_i$). From these, the injection rate ratio of microemulsion to aqueous liquid can be determined.

6. Optimize the viscosity ratio, reagent concentrations and injection rate ratio based on the foregoing by performing core floods similar to those performed in the Example (following).

7. Simultaneously inject the mutually immiscible microemulsion and aqueous phases having optimally adjusted viscosities (approximated by Eqn. 1) into the oil bearing formation at the optimum injection rate ratio (approximated by Eqn. 3).

Generally, the total amount of microemulsion and aqueous phase injected into the subterranean formation in accordance with the present invention will range from 0.02 to 2.5 pore volume of the subterranean formation to be flooded. For purposes of economics it is preferred that the amount of microemulsion injected be minimized, and will generally be less than 1 pore volume. In fact, a benefit of this invention is that a given volume of microemulsion is much more efficient than the same volume when used in conventional micellar flooding.

If desired, a bank of water containing the viscosity-increasing agent, may be injected before injecting the microemulsion and aqueous phases, i.e. a preflush solution is injected. While this is sometimes beneficial in order to assure that the microemulsion does not contact water in the formation which may be deleterious to the microemulsion system, it should be emphasized that the present invention does not depend on the use of such a preflush. Nevertheless, a preslug of an appropriately formulated brine tends to inhibit degradation of the microemulsion by divalent cations in the formation by displacing and exchanging the divalent cations ahead of the microemulsion. See, for example, U.S. Pat. No. 4,074,755 (Hill, et al) which issued on Feb. 21, 1978.

Following simultaneous injection of the microemulsion/aqueous phases in accordance with this invention, thickened water is preferably injected into the formation to displace injected microemulsion and aqueous phases through the formation to one or more production wells. The thickened water may comprise ordinary water or brine containing one or more conventionally employed thickeners. Suitable thickeners include the conventional thickeners discussed above for use in the aqueous phase or microemulsion. The salinity of the brine may be adjusted to give desirable phase behavior and improved oil recovery.

EXPERIMENTAL

In order to demonstrate the benefits of the present invention and verify that the simple mathematical model is, in fact, a reasonable and useful approximation of the true physical process, core flooding tests were performed using continuous simultaneous injection of microemulsion and aqueous phases. The tests were conducted using three Berea sandstone cores, designated herein as cores A, B, and C. Each core had a cross section of one by one inch and a length of 48 inches. The cores were mounted in epoxy with tap-fittings at each end for injection and production of the liquids.

The permeability of the cores to flow of oil and water graphed as a function of water (brine) saturation in the cores is shown in FIG. 2. These permeability data had been obtained for the cores prior to these tests using methods well known in the art. [See, e.g. T. W. Amyx, D. M. Bass, and R. L. Whiting, "Petroleum Reservoir Engineering", McGraw-Hill Book Co., N.Y. (1960).]

Prior to conducting displacement tests, the cores were flooded with oil and brine to approximate the oil and water saturations that would exist in an oil reservoir which had been flooded to the point that no further oil could be produced. In this flooding operation, the cores were first saturated with brine containing 2.25% NaCl by weight. The cores were then flooded with a mixture of Isopar-M and Heavy Aromatic Naphtha (HAN) in a 9/1 ratio until no further brine could be produced. Isopar-M and Heavy Aromatic Naphtha are trade names for refined paraffinic and aromatic oils, respectively, sold by Exxon Company, U.S.A. The cores were again flooded with brine to remove all the oil which could be removed by this conventional waterflooding process.

At this point, the quantities of water and oil remaining in the cores approximated those in the reservoir which had been waterflooded to residual oil saturation. The residual oil in the cores was approximately 32 percent of the pore volume in the cores; the remaining 58 percent was saturated with brine.

The oil viscosity was 2.6 centipoise and the brine viscosity was 1.0 centipoise; $\mu_w/\mu_o$ therefore was about 0.4. These viscosities, as well as micoemulsion and aqueous phase viscosities, were all measured using a Brookfield microviscometer at 75° F. and 10 sec$^{-1}$ using techniques well known in the art.

The upper-phase microemulsion used in these tests was of the following composition by volume:
82% brine solution containing 2.25% by weight sodium chloride;
15% oil, a 90/10 Isopar-M/HAN mixture; and
3% monoethanolamine salt of C-12 alkylorthoxylene sulfonate and tertiary amyl alcohol in a ratio of 63/37.
This microemulsion viscosity was 30 centipoises at a shear rate at 10 sec$^{-1}$.

The immiscible aqueous phase injected into the cores simultaneously with the microemulsion was a brine having the same salinity as the brine used to prepare the cores for the flooding tests. Table 1 below shows the polymer concentration in the brine and the viscosity of the brine (aqueous phase) injected into the respective cores.

TABLE 1

| Core | Kelzan XC (ppm) | Brine Viscosity (Centipoise)* | $\frac{\mu_a}{\mu_m}$ |
|------|-----------------|-------------------------------|-----------------------|
| A    | 0               | 1                             | 0.03                  |
| B    | 1000            | 18                            | 0.6                   |
| C    | 1500            | 36                            | 1.2                   |

*Viscosity at shear rate of ten sec$^{-1}$.

After the cores had been flooded to a residual oil saturation, the displacement tests were conducted on the cores. The three tests were run using continuous simultaneous injection of upper-phase microemulsion and thickened aqueous phase at the same injection rate ratio of 1.0. The viscosities of the aqueous phase were varied evenly over the range of interest, while microemulsion viscosity was held constant.

Figure 4:
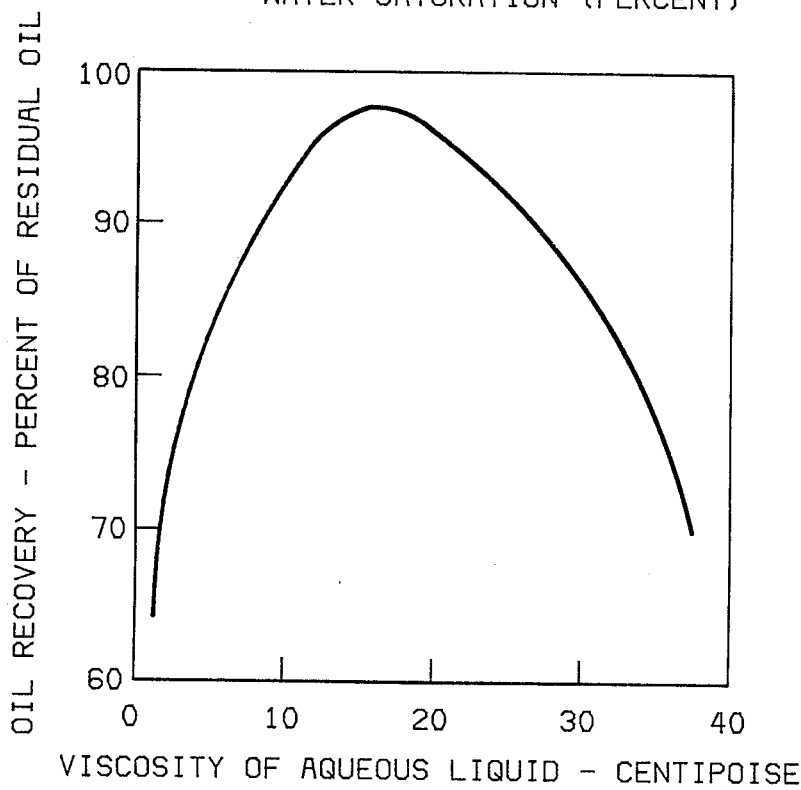
FIG. 4 graphically depicts the results of core displacement tests showing the relation between injected brine viscosity and percent of residual oil remaining after flooding with the microemulsion and brine.

Oil recovery is plotted as a function of injected aqueous phase viscosity in FIG. 4. As predicted by the simplified theory described previously herein, there is an optimum viscosity of the aqueous phase (actually viscosity ratio $\mu_a/\mu_m$, but $\mu_m$ remains constant in these tests).

This optimum experimentally occurs near 15 centipoise. Even at 18 cp., however, oil recovery is nearly complete, about 96% of $S_{or}$. Floods A and C, on the other hand, gave relatively poor oil recoveries, 64% and 71% of $S_{or}$, respectively.

At a given injection rate ratio, if the aqueous phase viscosity is too low, it can move faster than the microemulsion, intrude into the oil bank, reduce the total mobility and cause a saturation shock to develop. If it is too high, the aqueous phase lags behind the microemulsion front again causing an undesirable saturation shock to develop. As used herein, the expression "saturation shock" means an abrupt change in saturation.

Figure 5:
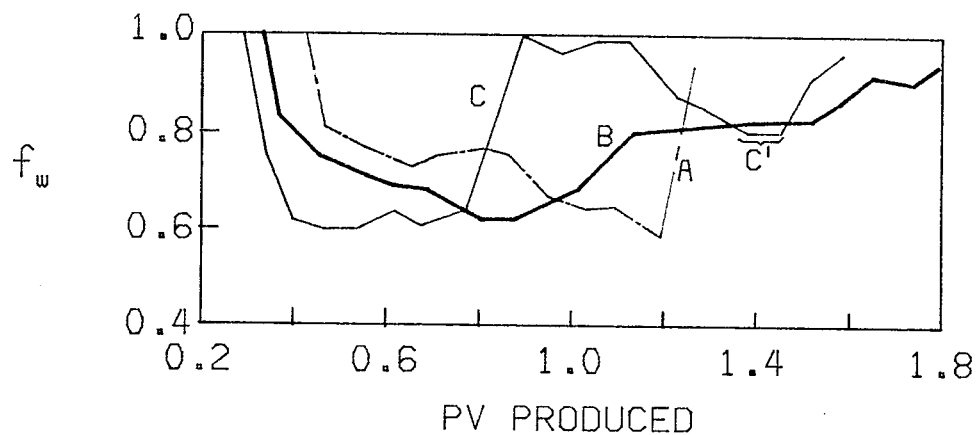
FIG. 5 is a plot of the fractional flow of water versus total volume produced for core floods performed to illustrate the invention.
Figure 6:
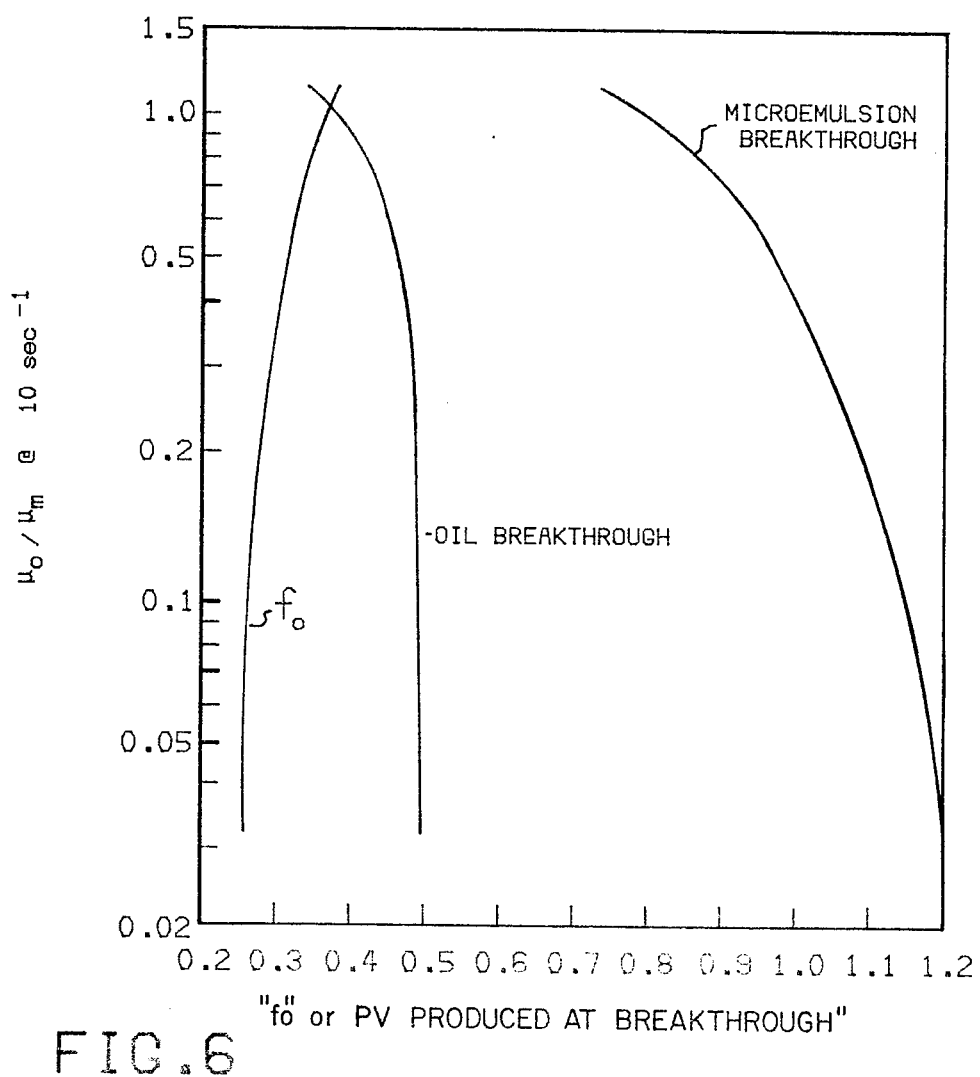
FIG. 6 illustrates the fractional flow of oil, oil breakthrough and microemulsion breakthrough in relation to the viscosity ratio of the injected phases.

Fractional flow data for the three floods are shown in FIG. 5, where $f_2$ (fractional flow of water) is plotted as a function of total pore volume (PV) produced. Other pertinent characteristics of the core floods are summarized in FIG. 6. In general, it was observed that oil breakthrough is earlier, visual microemulsion breakthrough is earlier, fractional flow of oil ($f_o$) is greater, and the stabilized bank is better defined as aqueous phase viscosity increases.

For test A, where the aqueous phase contained no polymer, oil arrival is late, $f_o$ is small, and surfactant arrival is late. All of these imply an ineffective oil displacement process. Presumably a substantial fraction of the microemulsion is flowing through channels containing only water.

For Test C, where the greatest aqueous phase viscosity was used, flooding was quite efficient for a while, with early oil arrival, good $f_o$ and early microemulsion breakthrough. However, the fractional flow history of FIG. 5 indicates that thickened aqueous phase is invading some channels that surround residual oil sites and trapping the oil there. Thus, secondary production in region C' of curve C in FIG. 5 is thought to reflect a subsequent redistribution of fluids and invasion of these regions by microemulsion in consequence of a change during the test to 100% thickened aqueous phase injection.

Injection of 18 centipoise aqueous phase in Test B produced the best results, which is expected since $\mu_a/\mu_m$ was 0.6 while $\mu_w/\mu_o$ was 0.4. Hence Test B was closest to the optimum viscosity ratio. However, oil production was not optimally efficient; also, oil arrival and surfactant arrival, while acceptable, were somewhat late. These results clearly stem from the fact that the optimum aqueous phase viscosity was not used in the core flood. Of course, when operating in the field, this data would be used to optimize the various parameters.

Equations (1) and (2) can be compared with experimental data of Test B where oil recovery was near 100%. For Equation (1), $\mu_w=1$, $\mu_o=2.6$, and $\mu_m=30$. Therefore, $$\mu_a = \frac{1}{2.6} \cdot (30) = 11.5 \text{ centipoise}$$

The polymer viscosity actually used was 18 cp. and from FIG. 4 the experimental optimum is about 15. For the simplified mathematical treatment presented, this is good agreement.

For Equation (2), $k_w/k_o$ is graphed as a function of water saturation in FIG. 3. Also, as previously described, FIG. 3 also plots calculated values of $$\frac{\mu_w}{\mu_o} \cdot \frac{S_w - S_i}{1 - S_w}$$

versus water saturation.

In FIG. 3, $S_i$ was estimated as 0.1 using principles previously mentioned and $\mu_w/\mu_o$ equals 1/2.6.

The intersection of the curves occurs at $S_w=0.54$, the water saturation of the stabilized bank. From Equation (2), the injection rate ratio is then:

$$\frac{q_a}{q_m} = \frac{0.542 - 0.1}{1 - 0.542} = 0.97$$

whereas that actually used in the tests was 1.0.

An added benefit of this invention is that a significant increase in injectivity of the immiscible phases is achieved. It has experimentally been determined that the mixture viscosity of the simultaneously injected phases is generally lower than the viscosity of the most viscous phase individually. Surprisingly, in many cases the mixture viscosity is less than the viscosity of either phase measured individually. As the viscosity of the injected phases decreases, the injectivity increases. The following table presents viscosity data illustrating the foregoing:

| Microemulsion Viscosity (cp) | Aqueous Phase Viscosity (cp) | Mixture Viscosity (cp) |
|---|---|---|
| 10 | 8.3 | 8.6 |
| 14.5 | 6.9 | 10.7 |
| 13.6 | 6.1 | 11.5 |
| 21.5 | 6.9 | 5.2 |
| 27.9 | 9.6 | 7.6 |

This is significant since many microemulsion flooding processes are injection rate limited. Where increased injectivity is achieved, as here, more oil recovery per unit time is possible simply because more driving fluids can be injected per unit time.

The principles of the invention and its best mode have been described. It is to be understood that the foregoing is illustrative only and that other means and techniques can be employed without departing from the true scope of the invention defined by the following claims:

What I claim is:

1. A method for recovering fluids from a subterranean formation containing hydrocarbon and aqueous liquids of known viscosities which comprises:
   (a) formulating a middle- or upper-phase microemulsion having a viscosity greater than said hydrocarbon and aqueous liquids;
   (b) formulating an aqueous phase having a viscosity greater than said aqueous liquids, the viscosity ratio of said aqueous phase to said microemulsion substantially approximating the viscosity ratio of said aqueous liquid to said hydrocarbon liquid;
   (c) simultaneously injecting into said formation through an injection well said aqueous phase and said microemulsion at an injection rate ratio which gives similar hydrocarbon, microemulsion and aqueous phase velocities through said formation;
   (d) displacing said microemulsion, aqueous phase and hydrocarbon liquids through said formation to a production well; and
   (e) producing said hydrocarbon liquids through said production well.

2. The method of claim 1 wherein the aqueous liquid is brine.

3. The method of claim 1 wherein the viscosity of said aqueous liquid is adjusted using a polymer.

4. The method of claim 3 wherein the polymer is a polysaccharide.

5. The method of claim 3 wherein the polymer is a polyacrylamide.

6. The method of claim 1 further comprising injecting an aqueous preflush solution before the simultaneous injection of the aqueous phase and microemulsion.

7. The method of claim 1 wherein said microemulsion and aqueous phase are driven through the formation by means of a thickened aqueous drive solution.

8. The method of claim 1 wherein said formation has been treated with a preflush solution prior to performing steps (a)–(e).

9. The method of claim 1 wherein the injectivity of said simultaneously injected microemulsion and aqueous phase mixture is at least greater than the injectivity of said aqueous phase alone.

10. The method of claim 1 wherein the injectivity of said simultaneously injected microemulsion and aqueous phase mixture is greater than the injectivity of either individually.

11. A method for recovering oil from a subterranean formation containing crude oil and water of known viscosities which comprises:

(a) simultaneously injecting into the formation through an injection well a middle- or upper-phase microemulsion and an immiscible aqueous phase, the viscosities of said aqueous phase and said microemulsion being greater than the viscosities of the crude oil and water in said formation, the viscosities of said microemulsion and said aqueous phase being adjusted so that the following relationship is approximated:

$$\mu_a/\mu_m = \mu_w/\mu_o$$

where $\mu_a$ = viscosity of the aqueous phase;
$\mu_m$ = viscosity of the microemulsion;
$\mu_w$ = viscosity of water in the formation; and
$\mu_o$ = viscosity of crude oil in the formation;

(b) simultaneously injecting into said formation through an injection well said microemulsion and aqueous phase at injection rates which substantially satisfy the following relationship:

$$\frac{q_a}{q_m} = \frac{S_w - S_i}{1 - S_w}$$

where $q_a$ = the rate of aqueous phase injection;
$q_m$ = the rate of microemulsion injection;
$S_w$ = the saturation of water in a stabilized oil/water bank ahead of the injected microemulsion/aqueous phase; and
$S_i$ = the saturation of an immobile phase representing the net effect on aqueous phase flow rate of inaccessible pore volume and adsorption;

(c) displacing said microemulsion, aqueous phase and crude oil through said formation to a production well; and (d) recovering crude oil through said production well.

12. An enhanced oil recovery method which comprises:

(a) simultaneously injecting into an oil bearing formation by means of an injection well a microemulsion and an aqueous phase which is immiscible therewith, the viscosities of said microemulsion and said aqueous phase having been previously adjusted such that the ratio of the microemulsion viscosity to the aqueous phase viscosity is approximately equal to the ratio of crude oil viscosity to formation brine viscosity, said microemulsion and said aqueous phase each being simultaneously injected into said injection well at rates such that substantially similar oil-bank and microemulsion/aqueous phase bank velocities exist in said formation;

(b) injecting a thickened aqueous drive fluid to displace said microemulsion/aqueous phase-bank and said oil-bank through said formation to a producing well; and (c) producing displaced crude oil via said producing well.

13. The method of claim 12 wherein the viscosities of the microemulsion and aqueous phase are adjusted by using a polysaccharide.

14. The method of claim 12 wherein the viscosities of the microemulsion and aqueous phases are adjusted by using a polyacrylamide.

15. The method of claim 12 wherein the injection rates of microemulsion and aqueous phase approximately satisfy the equation:

$$\frac{q_a}{q_m} = \frac{S_w - S_i}{1 - S_w}$$

where $q_a$ = the rate of aqueous phase injection;
$q_m$ = the rate of microemulsion injection;
$S_w$ = the saturation of water in a stabilized oil/water bank ahead of the injected microemulsion/aqueous phase; and
$S_i$ = the saturation of an immobile phase representing the net effect on aqueous phase flow rate of inaccessible pore volume and adsorption.

16. The method of claim 12 wherein the viscosity of the microemulsion and aqueous phase mixture is less than the viscosity of the aqueous phase alone.

17. The method of claim 12 wherein the viscosity of the microemulsion and aqueous phase mixture is less than the viscosity of either phase individually.

* * * * *